United States Patent Office 3,214,471
Patented Oct. 26, 1965

3,214,471
TRI-N-ARYL-N-ALKYLAMINOMETHANES AND PREPARATION THEREOF
David H. Clemens, Willow Grove, Pa., assignor to Rohm & Haas Company, Philadelphia, Pa., a corporation of Delaware
No Drawing. Filed Feb. 17, 1961, Ser. No. 89,900
18 Claims. (Cl. 260—570.5)

This invention relates to new tri-N-aryl-N-alkylaminomethanes and their preparation.

The compounds of the invention may be represented by the following Formula I:

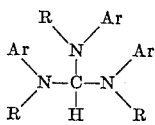

wherein Ar represents an aryl group and R represents an alkyl group.

The tri-N-aryl-N-alkylaminomethane compounds of the invention are useful pesticides; especially as heribicides. They are useful inhibitors of polymerizable compounds, including ethylenically and vinylidene unsaturated monomers. They are useful in a number of reactions and especially valuable in the preparation of formamidium salts.

Typical of the new compounds of the invention are the following:

N,N',N-triphenyl-N,N',N''-trimethyltriaminomethane,
N,N',N''-triphenyl-N,N',N''-triethyltriaminomethane,
N,N',N''-triphenyl-N,N',N''-tricyclohexyltriaminomethane,
N,N',N''-tri-p-nitrophenyl-N,N',N''-trimethyltriaminomethane,
N,N',N''-tri-p-nitrophenyl-N,N',N''-tripropyltriaminomethane,
N,N',N''-tri-2,4-dinitrophenyl-N,N',N''-triethyltriaminomethane,
N,N',N''-triphenyl-N,N',N''-tri-t-butyltriaminomethane,
N,N',N''-tri-2,4-dinitrophenyl-N,N',N''-trimethyltriaminomethane,
N,N',N''-tri-α-naphthyl-N,N',N''-trimethyltriaminomethane,
N,N',N''-tri-α-methylnaphthyl-N,N',N''-trimethyltriaminomethane,
N,N',N''-tri-o-bromophenyl-N,N',N''-trimethyltriaminomethane,
N,N',N''-tri-m-ethoxyphenyl-N,N',N''-trimethyltriaminomethane,
N,N',N''-tri-α-2,3-xylidyl-N,N',N''-trimethyltriaminomethane,
N,N',N''-tri-p-tolyidyl-N,N',N''-trimethyltriaminomethane,
N,N',N''-tri-2-isopropyl-5-methylphenyl-N,N',N''-trimethyltriaminomethane,
N,N',N''-trioctyl-N,N',N''-triphenyltriaminomethane,
N,N',N''-tridodecyl-N,N',N''-triphenyltriaminomethane, and
N,N',N''-trioctadecyl-N,N',N''-triphenyltriaminomethane.

In the Formula I for the tri-N-aryl-N-alkylaminomethanes of the invention, R represents aliphatic hydrocarbon group such as an alkyl group or an alkaryl group. The alkyl group may be straight or branched and it includes cycloalkyl groups, such as cyclohexyl. Typical alkyl groups include methyl, ethyl, isopropyl, 2-ethylhexyl, n-octyl, isononyl, cyclohexyl, 2-methylcyclohexyl, dodecyl, 2,2,5-trimethyloctyl, tetradecyl, octadecyl, benzyl, ethyl benzyl, and the like. Ar represents an aromatic hydrocarbon group, such as an aryl group, such as phenyl, naphthyl, and the like. The aryl group may, optionally, be substituted with inert substituents, such as alkyl, such as methyl, ethyl, isopropyl, n-octyl, t-octyl, and like alkyl groups; halo substituents such as fluoro, chloro, bromo, and iodo; nitro substituents; alkoxy substituents such as methoxy, ethoxy, nonoxy, or other substituents, such as cyano, benzyl, dimethylamino, dibutylamino, methyloctylamino, allyl, methallyl, and the like.

The invention also provides a method for preparing the tri-N-aryl-N-alkylaminomethanes which comprises reacting an N-alkyl aniline (1) with an alkali metal hydride (2), whereby a salt (3) of the N-alkyl aniline is formed and reacting said salt with a halo-hydrocarbon (4) whereby the tri-N-alkyl-N-alkylaminomethane of Formula I is formed. The reaction may be represented by the following schematic diagram

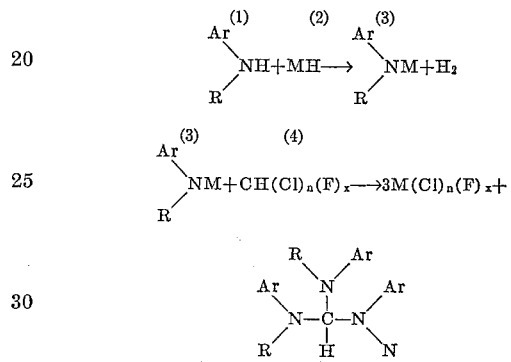

In compounds (1) and (3) and in the products of Formula I, Ar and R are defined above. In compound (2), M is an alkali metal of an atomic number of 3 to 55, inclusive, preferably lithium, sodium, potassium, or cesium. In compound (4), $n$ is an integer of 1, 2 and 3, and $x$ is an integer of 0, 1, and 2 with the proviso that the sum of $n+x$ always equals 3. Amongst the halo-hydrocarbons, the gaseous ones are preferred and amongst these, chlorodifluoromethane.

In the above reaction, instead of an alkali metal hydride, there may be employed other forms of the alkaline metal, such as alkoxides of the alkali metal, such as the methoxide and the like or there may be employed the hydroxides of the alkali metal, such as sodium hydroxide, potassium hydroxide, and the like. When the hydride of an alkali metal is employed, the hydrogen gas which is liberated comes off readily from the reaction mixture; when other forms of alkali metals are employed, such as an hydroxide or an alkoxide, it is preferable to provide means for precluding that the water or the alcohol which is given off during the reaction interferes with it. Instead of using a hydride of the alkali metal, there may also be used the alkaline earth metals, such as calcium, copper, or any other positive ion capable of existence in the presence of the N-alkyl aniline.

In the reaction between compounds (1) and (2), it is preferred to employ one mole of each to insure completeness of the reaction; conveniently, excess of (2), as 50 to 100 mole percent, may be used. In the reaction between (3) and (4), it is preferable, for best results, to employ three moles of the salt of the N-alkylaniline for each mole of the halo-hydrocarbon, but excess of either is not detrimental.

The reaction between compounds (1) and (2) is carried out in the temperature range of about 10° to 200° C. and short of the decomposition temperature of the salt. Preferably, the temperature ranges between 50° and 100° C. The reaction between compounds (3) and (4) is exothermic and, accordingly, in order to promote best yields, it is advantageous to maintain the temperature not to exceed 200° C., preferably below 100° C. It is very convenient to run the reaction at the boiling temperature of the reaction mixture. As the halo-hydrocarbon is fed to the reaction mixture, the temperature increases and the course of the reaction may be followed by the exotherm, the end of the reaction being indicated as the exotherm subsides. To insure completeness of the reaction, further heating may be carried out. The halo-hydrocarbon may be fed as a gas, or as a liquid, as with cooling under pressure. When it is a liquid, it may be fed in solution, in an inert solvent. The process of the invention may be carried out by mixing all three reactants (1), (2) and (4), thus initiating the formation of (3) and its reaction with (4); alternatively (1) and (2) may be reacted and when the formation of (3) is substantially completed it may be reacted with (4) to form the products of the invention. Other variants of these procedures are also suitable.

For convenience, it is preferable to run the reaction of the invention in the presence of an inert solvent. For this purpose, a hydrocarbon solvent, such as benzene, toluene, xylene, a tertiary amine, such as t-butylamine, a chlorinated hydrocarbon, such as ethylene dichloride may be employed; the solvents of choice are ethers such as 1,2-dimethoxyethane, diethylene glycol, dimethyl ether, tetraethylene glycol dimethyl ether, dibutyl ether, tetrahydrofuran, dioxane, dimethylether, and the like.

The product, when insoluble in the reaction mixture, may be separated by filtration and it may be further purified by washing with water and suitable solvents, such as acetone. If the product is more soluble in the reaction mixture, it may be isolated by adding a water-immiscible solvent followed by extraction by water, removal of the solvent, as by distillation under reduced pressure, and by crystallization.

The tri-N-alkyl-tri-N-arylaminomethanes of the invention may also be prepared by a method which comprises reacting a salt of an alkylaniline with an alkyl-aryl formamidium salt. In the reaction, which may be represented as follows, the symbols Ar, R, X and M are defined above.

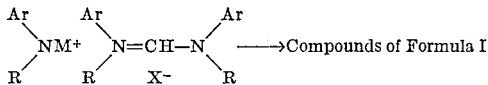

The salt of the alkylaniline may be formed in situ by providing, in conjunction with the alkylaniline,

a base which will preferentially react with the alkylaniline rather than with the formamidium salt. The reaction proceeds over a broad range of temperatures as from 0° to 150° C.

Alternatively, the tri-N-alkyl-tri-N-arylaminomethanes of the invention may be prepared by a method which comprises reacting an N-alkylaniline with an ortho ester. In the reaction, which may be represented as follows, the symbols Ar and R are defined above,

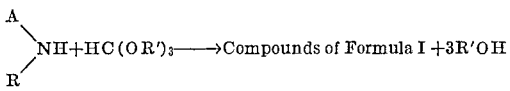

and R' is an alkyl group. Again, here, the reaction temperature may vary broadly, as from 0° to 200° C.

The other method for preparing the tri-N-alkyl-tri-N-arylaminomethane comprises reacting an N-alkylaniline with an alkali metal tri-haloacetate. In the reaction, which may be represented as follows:

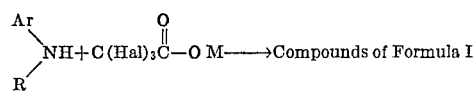

the symbols Ar, M, and R are defined above, and Hal is a halogen atom. Preferably, the temperature ranges from 50° to 150° C.

The formation of the tri-N-alkyl-tri-N-arylaminomethanes of the invention by the method of the invention is quite unexpected in view of the fact that the reaction of a lithium salt of a dialkylamine, as piperidine, with chlorodifluoromethane gave useless, tarry products.

The N-aryl-N-alkylaminomethanes of the invention are useful in a number of chemical reactions. For instance, they are useful in the formation of their formamidium salts by a reaction which comprises the treatment of a tri-N-aryl-N-alkylaminomethane with an acid. Typical of the acids are mineral acids, such as sulfuric acid, hydrochloric, hydrofluoric, hydrobromic, perchloric, and the like, and organic acids, such as acetic, propionic, chloroacetic, and the like. The formamidium salts which are formed may be represented by the Formula II

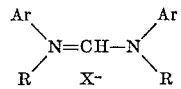

wherein Ar and R have the same definition as used in conjunction with the tri-N-aryl-N-alkylaminomethanes of the invention, and X may be any anion, such as 1/2 SO$_4$, Cl, F, Br, I,

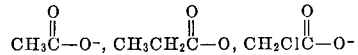

and the like. Other interesting reactions of the compounds of the invention include the following:

(a) the reaction with alkyl halides, R'X, wherein R' is any aliphatic group such as alkyl, aralkyl and alkenyl, X is a halogen atom as bromine, chlorine, and fluorine, to yield dialkylaniline,

and formamidium salts of Formula II, wherein R is any aliphatic group as alkyl, aralkyl and alkenyl, and R' is defined as in conjunction with Formula II;

(b) the reaction with acyl halides,

to give the formamidium salts of Formula II and acylated anilines,

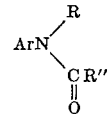

wherein R" is preferably a hydrocarbon group, such as alkyl, aryl, aralkyl, alkaryl or alkenyl and R is defined in Formula II, (c) the reaction with bromine to give the formamidium salts of Formula II and (d) the reaction with cyanogen bromide BrCN, to give an aryl alkyl cyanide

in which R has the definition given in Formula II.

The formamidium salts are useful compounds as the active ingredients of pesticides, particularly as fungicides and herbicides.

The tri-N-aryl-N-alkylaminomethanes of the invention are useful polymerization inhibitors. In particular, they inhibit the polymerization of vinylidene compounds. In standard polymerization inhibitor tests using the Onset time apparatus, polymerization at 100° C. of N-butyl acrylate inhibited with N,N',N"-triphenyl-N,N',N"-triethyl-tri-aminomethane was retarded by more than double the time required for uninhibited N-butyl acrylate to polymerize. Likewise, the polymerization of n-hexyl methacrylate was delayed by three hours by the addition of the same compound.

The compounds of the invention are also useful as post-emergence herbicides. Wild oats, mustard, millet, and mallow, two weeks after planting, were sprayed with N,N′,N″-triphenyl-N,N′,N″-triethyltriaminomethane at the rate of 10 lb./acre. Eighty percent kill and over was observed.

In agricultural applications, the compounds of the invention can be prepared in the form of dusts or powders, one or more of the triphenyltrialkylaminomethanes being taken up in a finely-divided solid carrier, such as talc, clay, bentonite, pyrophyllite, chalk, diatomaceous earth, or the like. Concentrations from 1% to 20% may be so used. Solvent solutions may also be prepared. Solutions in water-miscible solvents such as acetone or dioxane can be made and used by adding them to water and spraying the resulting mixture. The triphenyltrialkylaminomethanes may also be taken up in such a solvent as kerosene, xylene, or methylated naphthalenes. To these solutions emulsifying agents can be added to provide self-emulsifying concentrates for preparation of aqueous sprays.

The following examples are provided to further illustrate the invention. They are not to be construed as a limitation thereon. It will be apparent to one skilled in the art that the manipulative steps will generally be substantially identical when equivalent portions of reactants and their equivalets are substituted. All parts are by weight unless indicated to the contrary.

*Example 1(a)*

A 3-liter glass reaction vessel is equipped with a stirrer, a gas inlet near the bottom of the vessel, a pressure equalized dropping funnel, and a Dry-Ice cooled condenser. After sealing off the gas inlet, 700 parts of 1,2-dimethoxyethane and 108 parts of a 50% dispersion of sodium hydride in mineral oil are fed to the flask. Twenty-five parts of N-methylaniline are added through the dropping funnel and the reaction mixture is heated to reflux. After ten minutes at reflux, evolution of hydrogen gas started and the remaining 215 parts of N-methylaniline are added over a 15-minute period. Reflux is continued for fifteen minutes and heating is then discontinued as the evolution of gas tapers off, thus indicating that the formation of the sodium salt of N-methylaniline is substantially complete.

To the hot solution of the sodium salt of N-methylaniline in the reaction mixture there is admitted through the gas inlet tube gaseous chlorodifluoromethane at such a rate that reflux is maintained. After 45 minutes of refluxing as the vapors become cold, gas admission is stopped. Seventy-five parts of 1,2-dimethoxymethane are then added and heating to reflux is continued for 15 minutes. Heating is then discontinued and the precipitated solids are filtered off on a suction filter and washed with 200 parts of 1,2-dimethoxyethane. The solids are then slurried with 2000 parts of water, heated one hour on the steam bath, filtered, slurried with 1000 parts of acetone, stirred for five minutes and filtered again. This step is repeated again and the finely divided crystalline N,N′,N″-triphenyl-N,N′,N″-trimethyltriaminomethane is collected. The analysis is as follows: carbon 79.43% (theoretical 79.72%); hydrogen 7.65% (theoretical 7.60%); and nitrogen 12.82% (theoretical 12.68%).

*Example 1(b)*

Part (a) is repeated using 17.9 parts of lithium hydride in place of the sodium hydride.

*Example 1(c)*

Part (a) is repeated using instead of chlorodifluoromethane dichlorofluoromethane.

*Example 2(a)*

A 3-liter glass reaction vessel is equipped with a stirrer, a presssure equalized dropping funnel and a Dry-Ice cooled condenser. 1,2-dimethoxyethane (500 parts) and a 52% dispersion of sodium hydride in mineral oil (47.5 parts) are fed into the flask and heated to reflux. N-methylaniline (107 parts) is added slowly through the dropping funnel. When hydrogen evolution becomes very slow, a solution of chloroform (40 parts) in benzene (200 parts) was added slowly while maintaining the temperature at 35–50° C. by ice-cooling. When addition of the solution is completed, the reaction is slowly heated to 85° C. over a 45-minute period, cooled and filtered.

The filtered solid is treated with ethanol to destroy a small amount of unreacted sodium hydride and then washed with 1500 parts of water, slurried in isopropanol, filtered and dried to give N,N′,N″-triphenyl-N,N′,N″-trimethyltriaminomethane.

*Example 2(b)*

Part (a) is repeated substituting n-isodecylaniline for N-methylaniline. The product which is obtained is N,N′,N″-triisodecyl-N,N′,N″-triphenyltriaminomethane.

*Example 3*

(a) The reaction flask is equipped as in Example 1 and there is added 400 parts of 1,2-dimethoxyethane and 24 parts of a 50% dispersion of sodium hydride in mineral oil. Fifteen parts of N-ethylaniline are added through the dropping funnel and the reaction mixture is heated to reflux. After one hour at reflux, hydrogen evolution starts and the remaining 45.6 parts of N-ethylaniline are added dropwise. Reflux is now continued until gas evolution tapers off.

To the hot solution of the sodium salt of N-ethylaniline in the reaction mixture, there is admitted gaseous chlorodifluoromethane through the gas inlet at such a rate as to maintain reflux. As the refluxing vapors become cold, admission of gas is stopped and the reaction mixutre is cooled in ice and filtered. Volatile solvent is distilled off from the filtrate and the remaining oil is chilled overnight. A crystalline product is precipitated out and it is filtered from the reaction mixture. After recrystallization from 1,2-dimethoxyethane, N,N′,N″-triphenyl - N,N′,N″ - triethyltriaminomethane is obtained. The product melts at 180° to 186° C. The analysis is as follows: carbon 80.13% (theoretical 80.38%); hydrogen 8.38% (theoretical 8.37%); and nitrogen 11.03% (theoretical 11.25%).

(b) Part (a) is repeated substituting N-ethylaniline by 87.5 parts of N-cyclohexylaniline. The product is N,N′,N″ - triphenyl-N,N′,N″-tricyclohexyltriaminomethane.

(c) Part (a) is repeated substituting sodium hydride by 40.1 parts of a 50% dispersion of potassium hydride in mineral oil. The same product is obtained.

(d) Part (a) is repeated substituting sodium hydride by 8 parts of a 50% dispersion of lithium hydride in mineral oil. The same product is obtained.

(e) Part (a) is repeated substituting for 1,2-dimethoxyethane, diethylene glycol dimethyl ether.

(f) Part (a) is repeated substituting ethyl aniline by 37.3 parts of N-t-butylaniline. The product is N,N′,N″-triphenyl-N,N′,N″-tri-t-butyltriaminomethane.

*Example 4*

(a) A reaction vessel is equipped like in Example 1 and there is fed to it 500 parts of 1,2-dimethoxyethane, 50.6 parts of p-nitrophenyl-N-methylaniline and 16 parts of a 50% dispersion of sodium hydride in mineral oil. The mixture is heated to reflux. Gaseous chlorodifluoromethane is then run into the gas inlet tube until no more exotherm is observed and the refluxing vapors become cold. The reaction mixture is filtered and the resulting solid is slurried with 200 parts of water, filtered, slurried with 200 parts of 1,2-dimethoxyethane, filtered, and air-dried to give N,N',N''-tri-p-nitrophenyl-N,N',N''-trimethyltriaminomethane. The sample has a melting point of 260° to 265° C. The analysis is as follows: carbon 55.96% (theoretical 56.64%); hydrogen 4.96% (theoretical 4.76%); and nitrogen 17.73% (theoretical 18.02%).

(b) Part (a) is repeated substituting p-nitrophenyl-N-methylaniline by 40.5 parts of p-nitrophenyl-N-propylaniline. The product which is obtained is N,N',N''-tri-p-nitrophenyl-N,N',N''-tripropyltriaminomethane.

(c) Part (a) is repeated substituting p-nitrophenyl-N-methylaniline by 55 parts of 2,4-dinitrophenyl-N-methylaniline. The product which is obtained is N,N',N''-tri-2,4-dinitrophenyl-N,N',N''-trimethyltriaminomethane.

(d) Part (a) is repeated substituting chlorodifluoromethane by dichlorofluoromethane. The same product is obtained.

(e) Part (a) is repeated substituting sodium hydride by 27 parts of a 50% dispersion of potassium hydride in mineral oil.

(f) Part (a) is repeated substituting 1,2-dimethoxyethane by tetraethyleneglycol dimethyl ether.

(g) Part (a) is repeated substituting p-nitrophenyl-N-methylaniline by 45.6 parts of o-nitrophenyl-N-methylaniline. The product which is obtained is N,N',N''-tri-o-nitrophenyl-N,N',N''-trimethyltriaminomethane.

(h) Part (a) is repeated substituting p-nitrophenyl-N-methylaniline by 52 parts of N-methyl-o-bromoaniline to give N,N',N''-tri-o-bromophenyl-N,N',N''-trimethyltriaminomethane.

(i) Part (a) is repeated substituting p-nitrophenyl-N-methylaniline by 46 parts of m-ethoxy-N-methylaniline. The product which is obtained is N,N',N''-tri-m-ethoxyphenyl-N,N',N''-trimethyltriaminomethane.

*Example 5*

(a) A reaction flask is equipped as in Example 1 and there is fed to it 400 parts of 1,2-dimethoxyethane and 24 parts of a 50% dispersion of sodium hydride in mineral oil. 78.5 parts of N-methyl-α-naphthylamine are added through the dropping funnel and the reaction mixture is heated to reflux. Reflux is continued until hydrogen evolution subsides.

To the hot solution of the sodium salt of N-methyl-α-naphthylamine, gaseous chlorodifluoromethane is admitted through the inlet at a rate as to maintain reflux. When the reaction subsides, as evidenced by the cooling of the vapors, the reaction mixture is cooled and filtered. The product which is obtained is N,N',N''-tri-α-naphthyl-N,N',N''-trimethyltriaminomethane.

(b) Part (a) is repeated substituting N-methyl-α-naphthylamine by 82.2 parts of N-methyl-α-methylnaphthylamine. The product which is obtained is N,N',N''-tri-α-methylnaphthyl-N,N',N''-trimethyltriaminomethane.

(c) Part (a) is repeated substituting N-methyl-α-naphthylamine by 29.4 parts of N-methyl-2,3-xylidylamine. The product which is obtained is N,N',N''-tri-α-2,3-xylidyl-N,N',N''-trimethyltriaminomethane.

(d) Part (a) is repated substituting N-methyl-α-naphthylamine by 25.6 parts of N-methyl-p-tolyidylamine. The product which is obtained is N,N',N''-tri-p-tolyidyl-N,N',N''-trimethyltriaminomethane.

(e) Part (a) is repeated substituting N-methyl-α-naphthylamine by 35.8 parts of N-methyl-2-isopropyl-5-methylaniline. The product which is obtained is N,N',N''-tri-2-isopropyl-5-methylphenyl-N,N',N''-trimethyltriaminomethane.

*Example 6*

(a) Example 4(a) is repeated substituting for N-methyl-α-naphthylamine, 102.5 parts of n-octylaniline. The product which is obtained is N,N',N''-trioctyl-N,N',N''-triphenyltriaminomethane.

(b) Part (a) is repeated substituting for n-octylaniline 148 parts of dodecylaniline. The product which is obtained is N,N',N''-tridodecyl-N,N',N''-triphenyltriaminomethane.

(c) Part (a) is repeated substituting n-octylaniline by 166.7 parts of octadecylaniline. The product which is obtained is N,N',N''-trioctadecyl-N,N',N''-triphenyltriaminomethane.

(d) Part (a) is repeated substituting sodium hydride by 7.95 parts of a 50% dispersion of lithium hydride in mineral oil.

In a similar way, cesium hydride is employed.

*Example 7*

(a) In a reaction flask equipped as in Example 1(a) there is fed a mixture of 17.8 parts of N-methylaniline, 20.2 parts of N-ethylaniline, and 20.2 parts of N-methyl-p-toluidine. To this mixture there are admitted 400 parts of 1,2-dimethoxyethane and 24 parts of a 50% dispersion of sodium hydride in mineral oil. The mixture is brought to reflux and heating is continued until gas evolution becomes very slow. To the hot solution of the sodium salt of this mixture of N-alkylaniline, there is fed gaseous chlorodifluoromethane until the exotherm subsides. The product which is obtained is a mixture of N,N'-diphenyl-N''-p-tolyl-N-ethyl-N',N''-methyltriaminomethane, N,N'-diphenyl-N''-p-tolyl-N,N',N''-trimethyltriaminomethane, with minor amounts of other substituted triaminomethanes.

(b) Part (a) is repeated substituting sodium hydride by potassium hydride. The same product is obtained.

I claim:

1. A tri-N-aryl-N-alkylaminomethane of Formula I

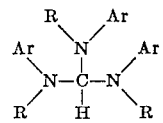

in which
R is a hydrocarbon group selected from the group consisting of alkyl of 1 to 18 carbon atoms, cyclohexyl, and 2-methylcyclohexyl, and in which Ar is an aromatic hydrocarbon group selected from the group consisting of aryl groups of 6 to 10 carbon atoms and substituted aryl groups, wherein the substituent is selected from the group consisting of alkyl, alkoxy, the alkyl group having from 1 to 8 carbon atoms, chloro, bromo, nitro, cyano, dialkylamino, wherein the alkyl group 1 to 8 carbon atoms, allyl, and methallyl.

2. The aminomethane of claim 1 in which R is an alkyl group containing from 1 to 6 carbon atoms and Ar is phenyl.

3. The aminomethane of claim 1 in which all R substituents are identical and all Ar substituents are also identical.

4. N,N',N'' - triphenyl - N,N',N''-trimethyltriaminomethane.

5. N,N',N''-triphenyl-N,N',N''-triethyltriaminothane.

6. N,N',N'' - tri - p - nitrophenyl-N,N',N''-tripropyltriaminomethane.

7. N,N',N''-tri-α-naphthyl-N,N',N''-trimethyltriaminomethane.

8. N,N',N'' - trioctyl - N,N',N'' - triphenyltriaminomethane.

9. A process for making tri-N-aryl-N-alkylaminomethane of Formula I

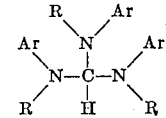

which comprises reacting an N-alkylaniline

with an alkali metal hydride, MH, whereby a salt

of the N-alkylaniline is formed and reacting said salt with a trihalohydrocarbon, $CH(Cl_n)F_x$, in which R is a hydrocarbon group selected from the group consisting of alkyl of 1 to 18 carbon atoms, cyclohexyl, and 2-methylcyclohexyl, and in which Ar is an aromatic hydrocarbon group selected from the group consisting of aryl groups of 6 to 10 carbon atoms and substituted aryl groups wherein the substituent is selected from the group consisting of alkyl, alkoxy, the alkyl group having 1 to 8 carbon atoms, chloro, bromo, nitro, cyano, dialkylamino, wherein the alkyl group has 1 to 8 carbon atoms, allyl and methallyl, M is an alkali metal of an atom number of 3–55 inclusive, $n$ is an integer of 1–3 inclusive, $x$ is an integer of 0–2 inclusive, and the sum of $n+x$ always equals 3.

10. The process of claim 9 in which there is employed at least one mole of the N-alkylaniline, at least one mole of the alkali metal hydride and at least one mole of the trihalo-hydrocarbon for each three moles of the salt of the N-alkylaniline.

11. The process of claim 9 in which the trihalo-hydrocarbon which is employed is gaseous.

12. The process of claim 11 in which the trihalo-hydrocarbon is chlorodifluoromethane.

13. The process of claim 9 in which the alkali metal hydride is sodium hydride.

14. The process of claim 9 in which the reaction temperature does not exceed 100° C.

15. The process of claim 14 in which the reaction is carried out at reflux.

16. A process for the preparation of N,N',N''-triphenyl-N,N',N''-trimethyltriaminomethane which comprises reacting N-methylaniline with sodium hydride, thereby forming a salt and reacting said salt with chlorodifluoromethane, there being employed in the reactions at least one mole of the N-methylaniline, at least one mole of the sodium hydride and at least one mole of the chlorodifluoromethane for each three moles of the salt of the N-methylaniline.

17. The process for the preparation of N,N',N''-triphenyl - N,N',N'' - triethyltriaminomethane which comprises reacting N-ethylaniline with sodium hydride, thereby forming a salt and reacting said salt with chlorodifluoromethane, there being employed in the reactions at least one mole of the N-ethylaniline, at least one mole of the sodium hydride and at least one mole of the chlorodifluoromethane for each three moles of the salt of the N-ethylaniline.

18. The process for the preparation of N,N',N''-tri-p-nitrophenyl - N,N',N'' - trimethylaminomethane which comprises reacting p-nitrophenyl-N-methylaniline with sodium hydride, thereby forming the salt and reacting said salt with chlorodifluoromethane, there being employed in the reactions at least one mole of the p-nitrophenyl-N-methylaniline, at least one mole of the sodium hydride and at least one mole of the chlorodifluoromethane for each three moles of the salt of the p-nitrophenyl-N-methylaniline.

References Cited by the Examiner

UNITED STATES PATENTS

| | | | |
|---|---|---|---|
| 1,882,759 | 10/32 | Britton et al. | 260—576 |
| 2,809,994 | 10/57 | Hinckley | 260—577 X |
| 2,987,547 | 6/61 | Mahan | 260—576 |

OTHER REFERENCES

Bergmann: "Acetylene Chemistry," 1948, page 80.

Giacalone: "Chemical Abstracts," vol. 27, page 80 (1933).

Wheland et al.: "Jour. Amer. Chem. Soc.," vol. 62, pages 1125–7 (1940).

CHARLES B. PARKER, *Primary Examiner.*